(12) United States Patent
Klaveness et al.

(10) Patent No.: US 11,071,930 B2
(45) Date of Patent: Jul. 27, 2021

(54) SYSTEM AND METHOD FOR FLUID PROCESSING

(71) Applicant: AKER SOLUTIONS AS, Lysaker (NO)

(72) Inventors: Arne Klaveness, Sandefjord (NO); Lars Krogstad Lien, Oslo (NO)

(73) Assignee: AKER SOLUTIONS AS, Lysaker (NO)

( * ) Notice: Subject to any disclaimer, the term of this patent is extended or adjusted under 35 U.S.C. 154(b) by 0 days.

(21) Appl. No.: 16/613,417

(22) PCT Filed: May 15, 2017

(86) PCT No.: PCT/NO2017/050119
§ 371 (c)(1),
(2) Date: Nov. 14, 2019

(87) PCT Pub. No.: WO2018/212661
PCT Pub. Date: Nov. 22, 2018

(65) Prior Publication Data
US 2020/0070066 A1 Mar. 5, 2020

(51) Int. Cl.
| | |
|---|---|
| *B01D 17/02* | (2006.01) |
| *B01D 19/00* | (2006.01) |
| *B01D 21/26* | (2006.01) |
| *E21B 43/36* | (2006.01) |
| *B01D 21/00* | (2006.01) |

(Continued)

(52) U.S. Cl.
CPC ....... *B01D 21/267* (2013.01); *B01D 17/0214* (2013.01); *B01D 17/0217* (2013.01); *B01D 19/0052* (2013.01); *B01D 21/0018* (2013.01); *B01D 21/10* (2013.01); *E21B 43/34* (2013.01); *E21B 43/36* (2013.01)

(58) Field of Classification Search
CPC ............ B01D 17/0214; B01D 17/0217; B01D 21/267; E21B 43/34; E21B 43/36
See application file for complete search history.

(56) References Cited

U.S. PATENT DOCUMENTS

| | | |
|---|---|---|
| 4,596,586 A | 6/1986 | Davies et al. |
| 5,135,684 A | 8/1992 | Mohn et al. |

(Continued)

FOREIGN PATENT DOCUMENTS

| | | |
|---|---|---|
| EP | 0 018 168 A2 | 10/1980 |
| EP | 2 218 870 A2 | 8/2010 |

(Continued)

*Primary Examiner* — Bradley R Spies
(74) *Attorney, Agent, or Firm* — Norman B. Thot

(57) ABSTRACT

A fluid separator unit includes an elongate body having a circular internal cross-section and a longitudinal axis, an inlet which directs a fluid flow into the body in a rotational flow pattern around the longitudinal axis, a first outlet, a second outlet, a first centrifugal separation zone arranged within the body, a second centrifugal separation zone arranged within the body, a first fluid path from a central part of the first centrifugal separation zone to the first outlet, a second fluid path from an outer periphery of the second centrifugal separation zone to the first outlet, and a third fluid path from the second centrifugal separation zone to the second outlet. A diameter of the second centrifugal separation zone is smaller than a diameter of the first centrifugal separation zone.

21 Claims, 11 Drawing Sheets

(51) Int. Cl.
*B01D 21/02* (2006.01)
*E21B 43/34* (2006.01)

(56) References Cited

U.S. PATENT DOCUMENTS

| | | | |
|---|---|---|---|
| 5,254,292 | A | 10/1993 | Gabryelczyk et al. |
| 5,332,500 | A * | 7/1994 | Seureau .................... B04C 5/13 |
| | | | 210/512.1 |
| 6,007,306 | A | 12/1999 | Vilagines |
| 7,516,795 | B2 | 4/2009 | Lopes Euphemio et al. |
| 7,565,932 | B2 | 7/2009 | Lawson |
| 7,569,097 | B2 | 8/2009 | Campen et al. |
| 8,083,419 | B2 | 12/2011 | Sato |
| 8,083,501 | B2 | 12/2011 | Scarsdale |
| 8,500,419 | B2 | 8/2013 | Scarsdale |
| 2007/0235195 | A1 | 10/2007 | Lawson |
| 2010/0064893 | A1 | 3/2010 | Hopper |
| 2010/0200242 | A1 | 8/2010 | Rodger et al. |
| 2011/0155385 | A1 | 6/2011 | Håheim |
| 2013/0327727 | A1* | 12/2013 | Hopper .............. B01D 17/0217 |
| | | | 210/787 |
| 2015/0226214 | A1 | 8/2015 | Rohlfing et al. |
| 2015/0315884 | A1* | 11/2015 | Hofstad ................ E21B 43/121 |
| | | | 415/1 |
| 2017/0159411 | A1 | 6/2017 | Homstvedt et al. |

FOREIGN PATENT DOCUMENTS

| | | |
|---|---|---|
| GB | 2 215 408 A | 9/1989 |
| GB | 2 439 528 A | 1/2008 |
| WO | WO 2014/019687 A2 | 2/2014 |
| WO | WO 2015/199546 A1 | 12/2015 |

* cited by examiner

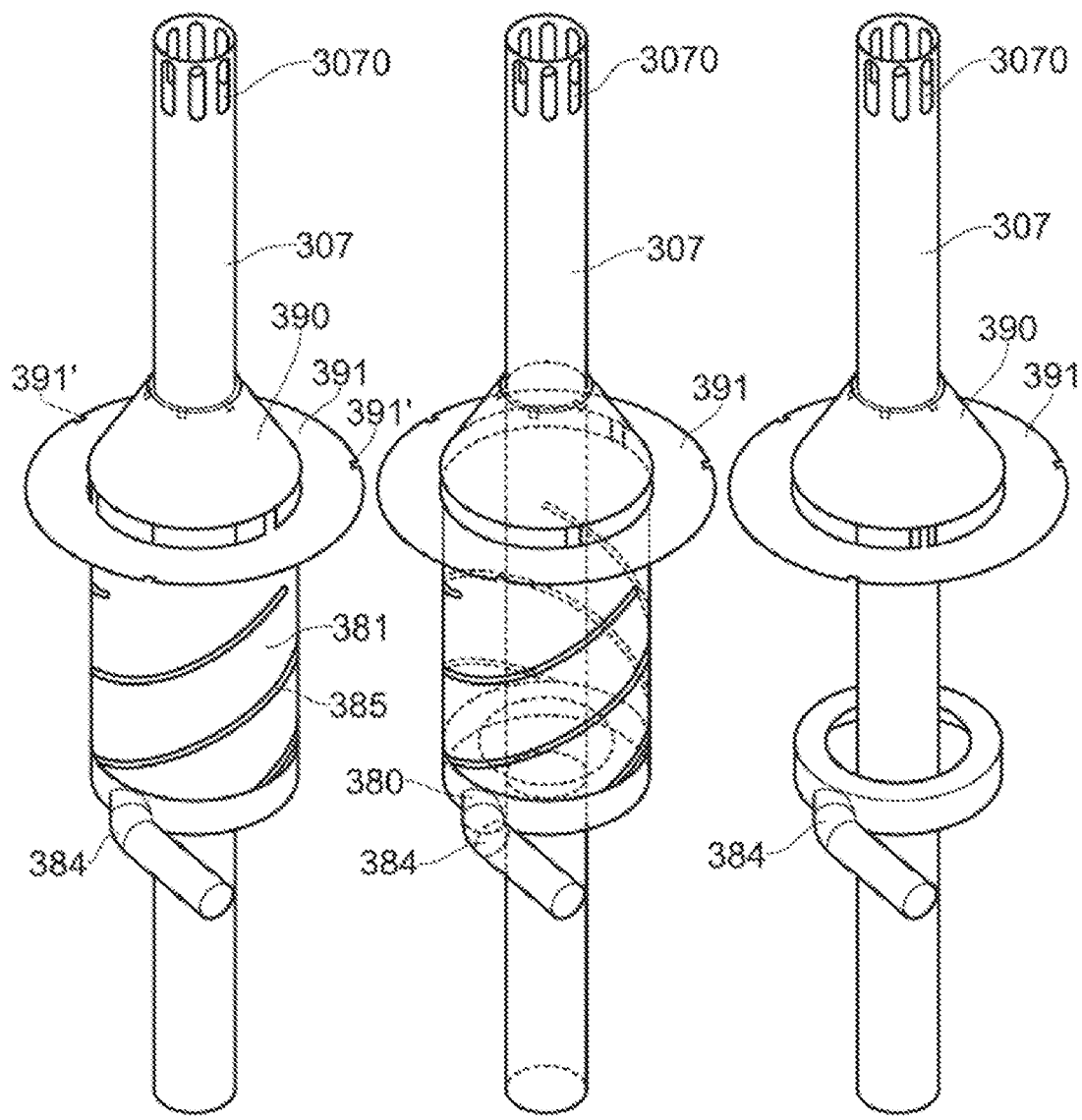
Fig. 5   Fig. 6   Fig. 7

# US 11,071,930 B2

SYSTEM AND METHOD FOR FLUID PROCESSING

CROSS REFERENCE TO PRIOR APPLICATIONS

This application is a U.S. National Phase application under 35 U.S.C. § 371 of International Application No. PCT/NO2017/050119, filed on May 15, 2017. The International Application was published in English on Nov. 22, 2018 as WO 2018/212661 A1 under PCT Article 21(2).

FIELD

The present invention relates to systems and methods for fluid processing, including but not limited to processes associated with pumping, flow conditioning, and/or separation in petroleum production in subsea, topside or land-based applications.

BACKGROUND

A continuous demand exists for improved pressure boosting and fluid processing for various applications, for example, in the petroleum industry. In the petroleum industry, technological advances continually enables exploitation of more remote and challenging fields, as well as better utilization of existing fields. Both these aspects set increasing demands on equipment used for such fluid processing, both in terms of the external conditions under which it operates, and in terms of the fluids handled being more demanding.

Petroleum operations are expensive and equipment reliability is therefore one of the most vital selection criteria. Rotating equipment, for example, requires more frequent service than does static equipment, and reliability and serviceability are usually given high priority in the design of such equipment. Electrical submersible pumps (ESP), for example, have limited service life compared to other pumps, in part due to the design and in part due to the very challenging environment where they are normally installed.

Documents useful for understanding the background of the present application include: GB 2 215 408; U.S. Pat. Nos. 5,135,684; 5,254,292; 6,007,306; 7,569,097; US 2011/0155385; WO 2014/019687; WO 2015/199546; US 2007/0235195; U.S. Pat. Nos. 7,565,932; 7,516,795; 8,500,419; 8,083,501; and 8,083,419.

SUMMARY

A continuous need for improved solutions and techniques for petroleum fluid processing exists, including but not limited to processes associated with pumping, flow conditioning, and/or separation subsea or topside. An aspect of the present invention is therefore to provide such improvements.

In an embodiment, the present invention provides a fluid separator unit which includes a body configured to be elongate and comprising a circular internal cross-section and a longitudinal axis, an inlet configured to direct a flow of a fluid into the body in a rotational flow pattern around the longitudinal axis of the body, a first outlet, a second outlet, a first centrifugal separation zone arranged within the body, a second centrifugal separation zone arranged within the body, a first fluid path from a central part of the first centrifugal separation zone to the first outlet, a second fluid path from an outer periphery of the second centrifugal separation zone to the first outlet, and a third fluid path from the second centrifugal separation zone to the second outlet. A diameter of the second centrifugal separation zone is smaller than a diameter of the first centrifugal separation zone.

BRIEF DESCRIPTION OF THE DRAWINGS

The present invention is described in greater detail below on the basis of embodiments and of the drawings in which:

FIG. 5 shows a perspective view of the cylindrical wall and associated components of the fluid separator of the present invention;

FIG. 6 shows the view of FIG. 5 with the cylindrical wall made transparent to show the arrangement of the components within the cylindrical wall;

FIG. 7 shows the views of FIGS. 5 and 6 with the cylindrical wall removed;

DETAILED DESCRIPTION

Figure 1:
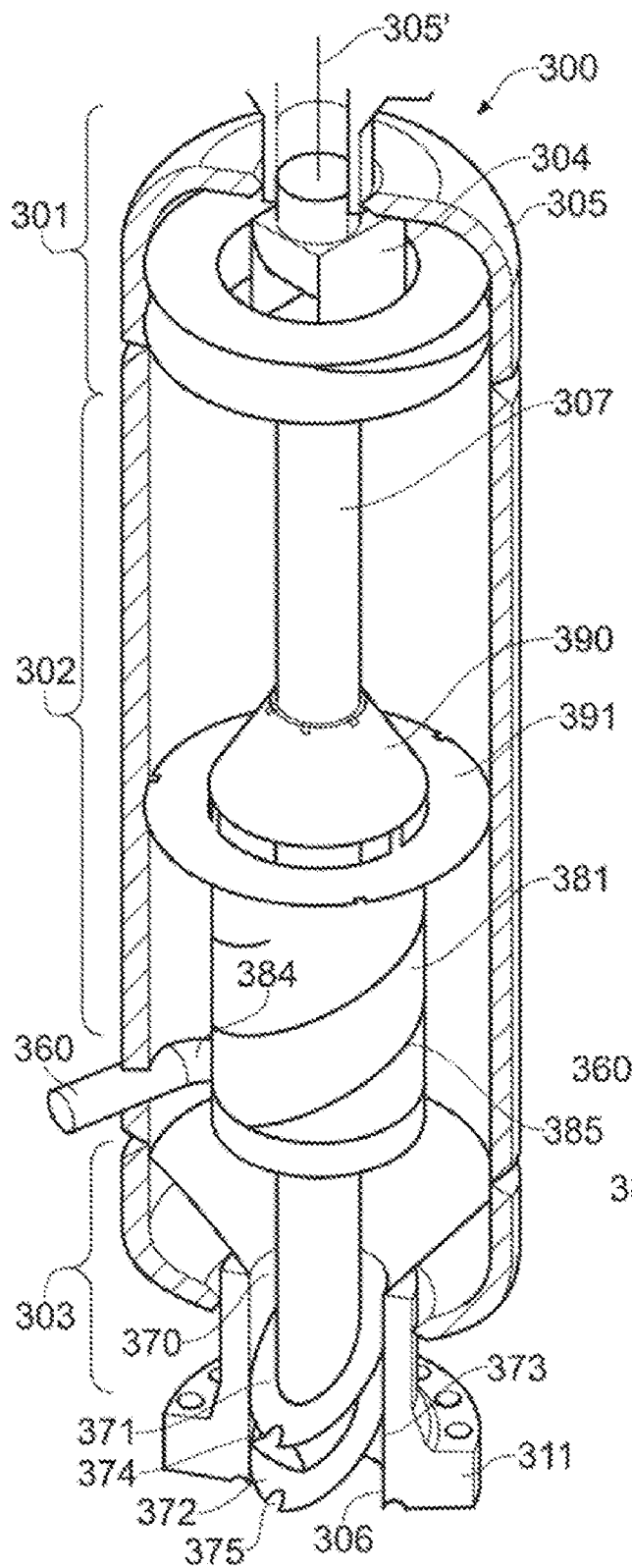
FIG. 1 shows a first view of the fluid separator unit of the present invention from the top with the elongate body partially cut away to show the inside of the fluid separator.
Figure 2:
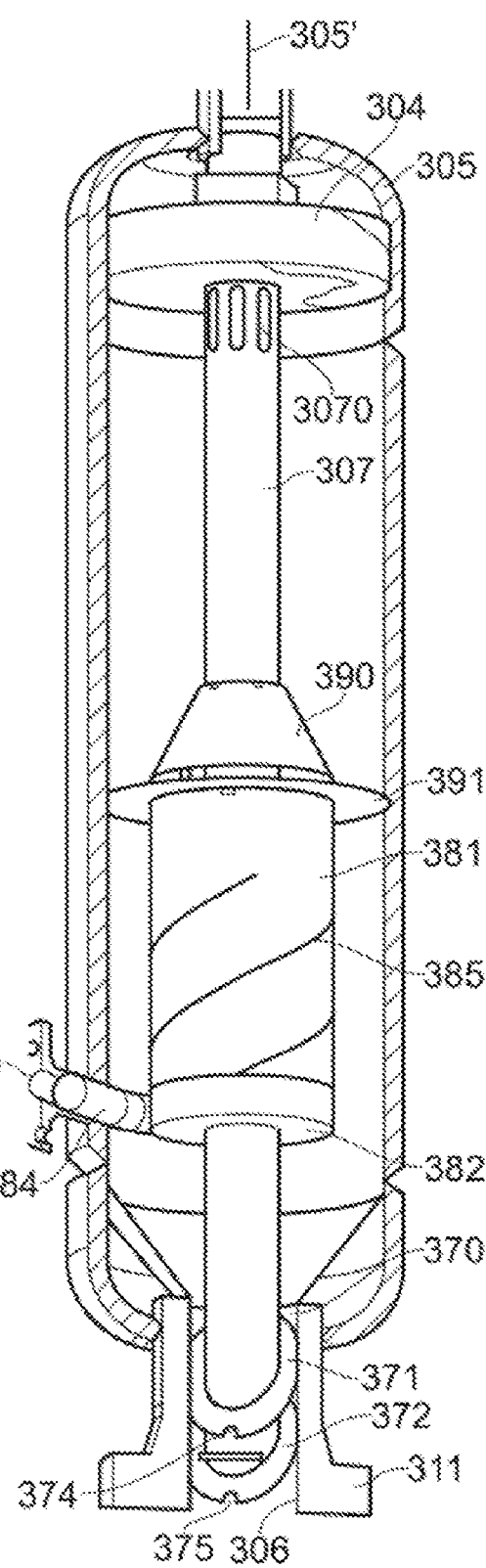
FIG. 2 shows a second view of the fluid separator unit of the present invention from the bottom with the elongate body partially cut away to show the inside of the fluid separator.
Figure 3:
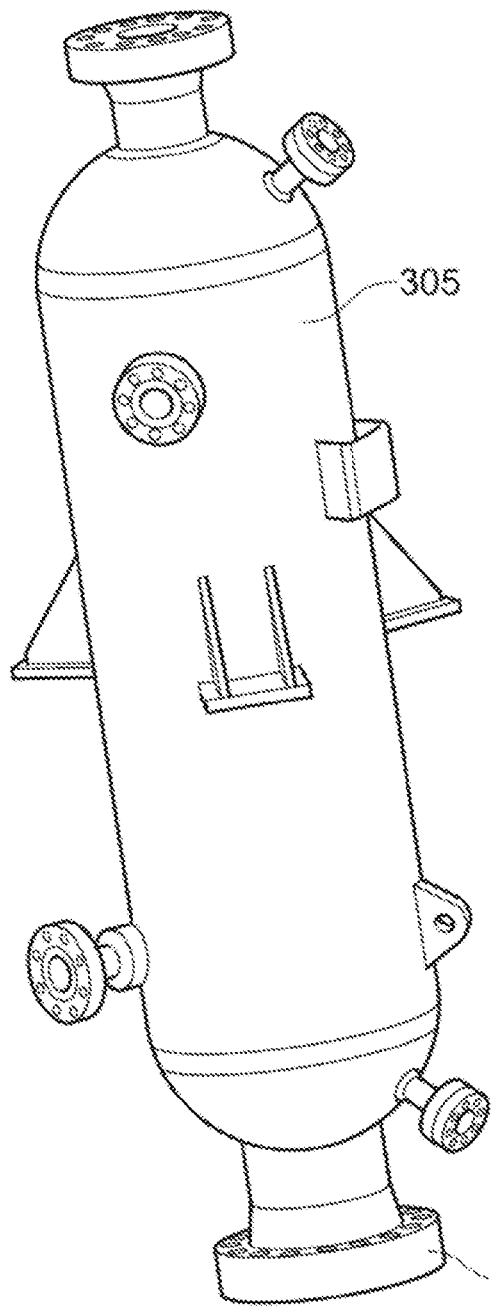
FIG. 3 shows a perspective view of the fluid separator unit of the present invention.
Figure 4:
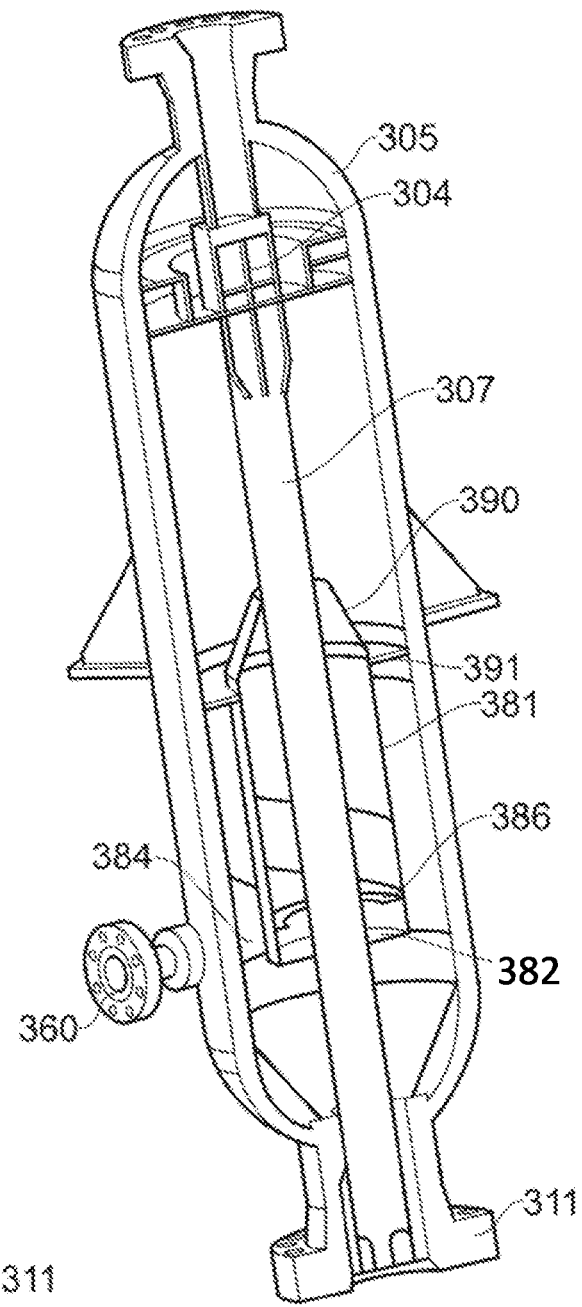
FIG. 4 shows a cross-sectional view of the fluid separator unit of the present invention.

Embodiments disclosed herein may, for example, be used in relation to tie-in, production and pressure boosting of hydrocarbons or other fluid flows handled in the petroleum industry.

In an embodiment, the present invention provides a fluid separator unit comprising: an elongate body having a circular internal cross-section, an inlet configured to direct a fluid flow into the body in a rotational flow pattern around a longitudinal axis of the body, a first outlet and a second outlet, wherein the fluid separator unit has a first centrifugal separation zone and a second centrifugal separation zone within the body, wherein the second centrifugal separation zone has a smaller diameter than the first centrifugal separation zone, a fluid path from a central part of the first centrifugal separation zone to the first outlet, a fluid path from an outer periphery of the second centrifugal separation zone to the outlet, and a fluid path from the second centrifugal separation zone to the second outlet.

In an embodiment, the fluid separator can, for example, comprise a fluid path from an outer periphery of the first centrifugal separation zone to the outlet.

In an embodiment, the second centrifugal separation zone can, for example, be defined by a cylindrical wall arranged within the body, and the fluid path from the second centrifugal separation zone to the second outlet can, for example, be provided by an opening arranged in the cylindrical wall and a pipe fluidly connecting the opening to the second outlet.

In an embodiment, the fluid separator can, for example, comprise a bottom plate fixed to a lower end of the cylindrical wall.

In an embodiment, the fluid path from the outer periphery of the second centrifugal separation zone to the outlet can, for example, comprise a radial opening in the cylindrical wall.

In an embodiment, the radial opening can, for example, extend in a spiral shape along the cylindrical wall.

In an embodiment, the fluid path from the second centrifugal separation zone to the second outlet can, for example, extend through a third centrifugal separation zone.

In an embodiment, the fluid separator can, for example, comprise an intermediate plate fixed to the cylindrical wall and extending inwards around the inner circumference of the cylindrical wall, wherein the opening is arranged in the cylindrical wall between the intermediate plate and the bottom plate.

In an embodiment, the intermediate plate and the bottom plate can, for example, define a third centrifugal separation zone therebetween.

In an embodiment, the fluid separator can, for example, comprise a spin-up plate arranged between the first centrifugal separation zone and the second centrifugal separation zone.

In an embodiment, the spin-up plate can, for example, comprise at least one hole therethrough, the at least one hole being arranged at an outer periphery of the spin-up plate.

In an embodiment, the at least one hole can, for example, define a part of the fluid path from the outer periphery of the first centrifugal separation zone to the outlet.

In an embodiment, the fluid path from the central part of the first centrifugal separation zone to the outlet can, for example, be provided by a pipe having a plurality of first openings, the pipe being arranged within the body and fluidly connected to the outlet, the first openings being positioned in the first centrifugal separation zone.

In an embodiment, the pipe can, for example, extend through the cylindrical wall.

In an embodiment, the fluid separator can, for example, comprise a second opening arranged in a lower section of the body, the second opening being fluidly connected to the outlet.

In an embodiment, the fluid separator can, for example, comprise a cylindrical flow channel arranged between the second opening and the outlet, a first plate can, for example, be arranged in the cylindrical flow channel, wherein the first plate is arranged at an angle in relation to the walls of the cylindrical flow channel which is different than 90 degrees.

In an embodiment, the fluid separator can, for example, comprise an opening at a part of the first plate which is closest to the outlet.

In an embodiment, the fluid separator can, for example, comprise a second plate arranged in the cylindrical flow channel, wherein the second plate is arranged at an angle in relation to the walls of the cylindrical flow channel which is different than 90 degrees.

In an embodiment, the angle of the first plate in relation to the walls of the cylindrical flow channel can, for example, be identical to the angle of the second plate in relation to the walls of the cylindrical flow channel.

In an embodiment, the fluid separator can, for example, comprise a third plate arranged in the cylindrical flow channel, the third plate being arranged between the first plate and the second plate.

In an embodiment, the angle of the third plate in relation to the walls of the cylindrical flow channel can, for example, be different from the angle of the first and second plates in relation to the walls of the cylindrical flow channel.

In an embodiment, the present invention also provides a pump arrangement comprising a fluid separator and a pressure boosting device, the fluid separator being arranged to receive a fluid stream from the pressure boosting device via a supply pipe, wherein a recycled liquid line is arranged between the second outlet and an inlet of the pressure boosting device.

Illustrative embodiments of the present invention will now be described with reference to the appended drawings.

In an embodiment, the present invention provides a fluid separator unit 300. With reference to FIGS. 1-4, the fluid separator unit 300 has an elongate body 305 with a substantially circular cross-section, an inlet 304, a first outlet 306, and a second outlet 360. The fluid separator unit 300 is configured to separate a fluid received at the inlet 304 so as to provide an intermediate density fraction through the second outlet 360 and light and heavy fractions through the first outlet 306.

The fluid separator unit 300 may, for example, be used to provide a separated fluid to a subsea boosting system as a recycled liquid for supply to a pump. The composition of such a recycled liquid is of key importance for the performance and the operational life of the pump. For example, it is not desirable to recycle fluids containing sand or similar particles because that may cause erosion or otherwise damage the pump. At high pressures, gases may also be absorbed into oil, thus recycling such oil may increase the gas fraction at the pump inlet, as such gas may be released when the recycled liquid is throttled down to a (comparatively) lower pressures at the pump inlet. It may therefore be desirable in such a system to only recycle a fraction of intermediate density, which may provide mainly, or substantially only, water. The highest density fraction, which may comprise water with sand particles or other elements, and the lightest fraction, which may contain petroleum fluids (oil and/or gases), may be passed on further in the subsea processing system, and not used for recycling purposes.

Other processing systems may have similar requirements. A fluid separator unit as described herein may thus have various other applications, which may include subsea, topside and land-based applications.

The inlet 304 is arranged in an upper section 301 of the body 305. The inlet 304 is configured to receive an input stream of fluid and direct the fluid, via baffles in the inlet 304, in a tangential direction along the inner circumference of the body 305, so as to create a rotational flow around the longitudinal axis 305' of the body 305. The incoming fluid will thus follow a substantially spiraling flow from the inlet 304 and downwards into the body 305, which allows for centrifugal separation of heavy and light fractions in the usual manner. The inlet 304 shown is an axial inlet from the top of the body 305. The inlet 304 may, with appropriate arrangement of baffles in the inlet 304, also be provided as a tangential inlet or as a radial inlet arranged in the upper section 301 of the body 305.

The fluid separator 300 further comprises a pipe 307 having a plurality of openings 3070, the pipe 307 being arranged within the body 305 and fluidly connected to the first outlet 306. The openings 3070 are positioned near the upper end of the pipe 307 and in an upper section 301 of the body 305. As fluid is provided through the inlet 304 and is distributed along the height of the body 305, the lightest fluids will tend towards the center and towards the upper end of the body 305 due to gravity and the centrifugal forces of the fluid motion created by the inlet 304. The lightest fluids can then be removed through the openings 3070, via the pipe 307, and to the first outlet 306. The openings 3070 are placed at a relatively small radius, forcing the liquid exiting the body 305 via the pipe 307 to have gone through high g-fields.

The fluid separator unit 300 further has a second opening 370 arranged in a lower section 303 of the body 305, the second opening 370 being fluidly connected to the first outlet 306. As the heavier fluid, and other components such as sand, accumulate in the lower section 303 of the body 305, these can be removed from the fluid separator through the second opening 370 and the first outlet 306.

The fluid separator further has a cylindrical wall 381, the cylindrical wall 381 being arranged in a middle section 302 of the body 305 concentric with the longitudinal axis 305' of the body 305. FIGS. 5-8 show the cylindrical wall 381 and associated components more clearly, in cut-out views. A bottom plate 382 is fixed to the cylindrical wall 381, wherein a fourth opening 380 (see FIG. 6) is arranged in the cylindrical wall 381, and a pipe 384 is provided to fluidly connect the fourth opening 380 to the second outlet 360. The pipe 307 extends concentrically inside the cylindrical wall 381 and through the bottom plate 382.

The cylindrical wall 381 and bottom plate 382 forms a cylindrical container-like structure (or "bucket") having a smaller radius than the inner radius of the body 305. As fluid flows into the bucket, the rotational speed will increase due to the conservation of momentum, creating higher g-forces on the fluid entering this bucket. One can therefore obtain an enhanced separation effect for the fluid flowing into the bucket.

The cylindrical wall 381 comprises one or more slots 385, forming a small opening in the cylindrical wall 381. In this embodiment, the slots 385 extends in a spiral shape along the cylindrical wall 381. The slots 385 allows heavier fragments, including sand, to escape the bucket, and flow downwards and out of the fluid separator unit 300 through the first outlet 306, while the remaining heavy fluid fractions flowing through the bucket is led out via the fourth opening 380.

Figure 8:
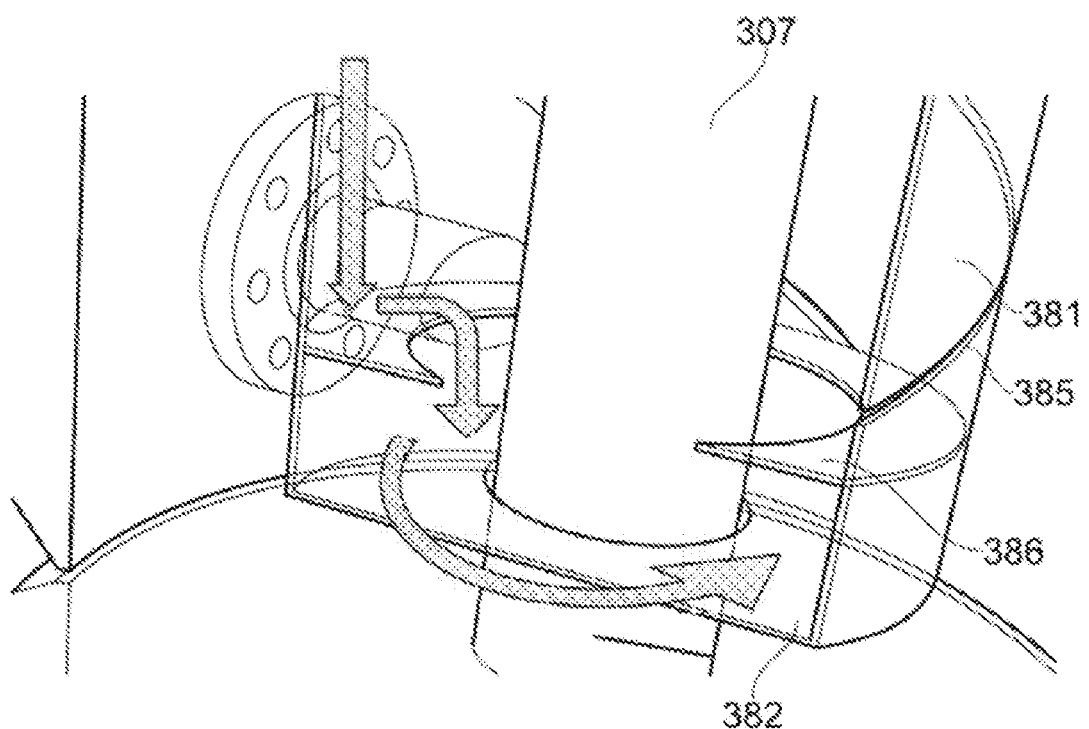
FIG. 8 shows the bucket having an intermediate plate fixed to the cylindrical wall.

FIG. 8 shows that the bucket may have an intermediate plate 386 fixed to the cylindrical wall 381 which extends inwards around the inner circumference of the cylindrical wall, wherein the fourth opening 380 is arranged in the cylindrical wall 381 below the intermediate plate 386. As described in further detail below, this helps to provide that no sand or other particles reach the fourth opening 380, as the intermediate plate 386 may block the path downwards towards the fourth opening 380 along the cylindrical wall 381. With the intermediate plate 386, the fluid flowing towards the fourth opening must flow inwards to pass the intermediate plate, as shown in FIG. 8.

The fluid separator unit 300 may further have a swirl cone ("dollar plate") 390 to stabilize the vortex. At its inner circumference, the swirl cone 390 may have openings or a gap towards the pipe 307 to allow lighter components to escape upwards near to the pipe 307.

A spin-up plate 391 may be arranged to improve the fluid flow fields, and in particular to direct fluid flow into the bucket defined by the cylindrical wall 381. The spin-up plate 391 thus forces liquid heading into the bucket inwards, so as to pass through a higher g-field. The spin-up plate 391 has perforations (or other types of openings) 391' (see FIGS. 5-7) on its outer rim to allow sand and heavy fractions to pass downwards to the lower chamber on the outside of the spin-up plate 391. The spin-up plate 391 may alternatively be arranged with a gap or openings towards the body 305 for the same purpose. This forms a flow path for fluid and/or solids to the first outlet 306 without passing through the bucket defined by the cylindrical wall 381.

Figure 9:
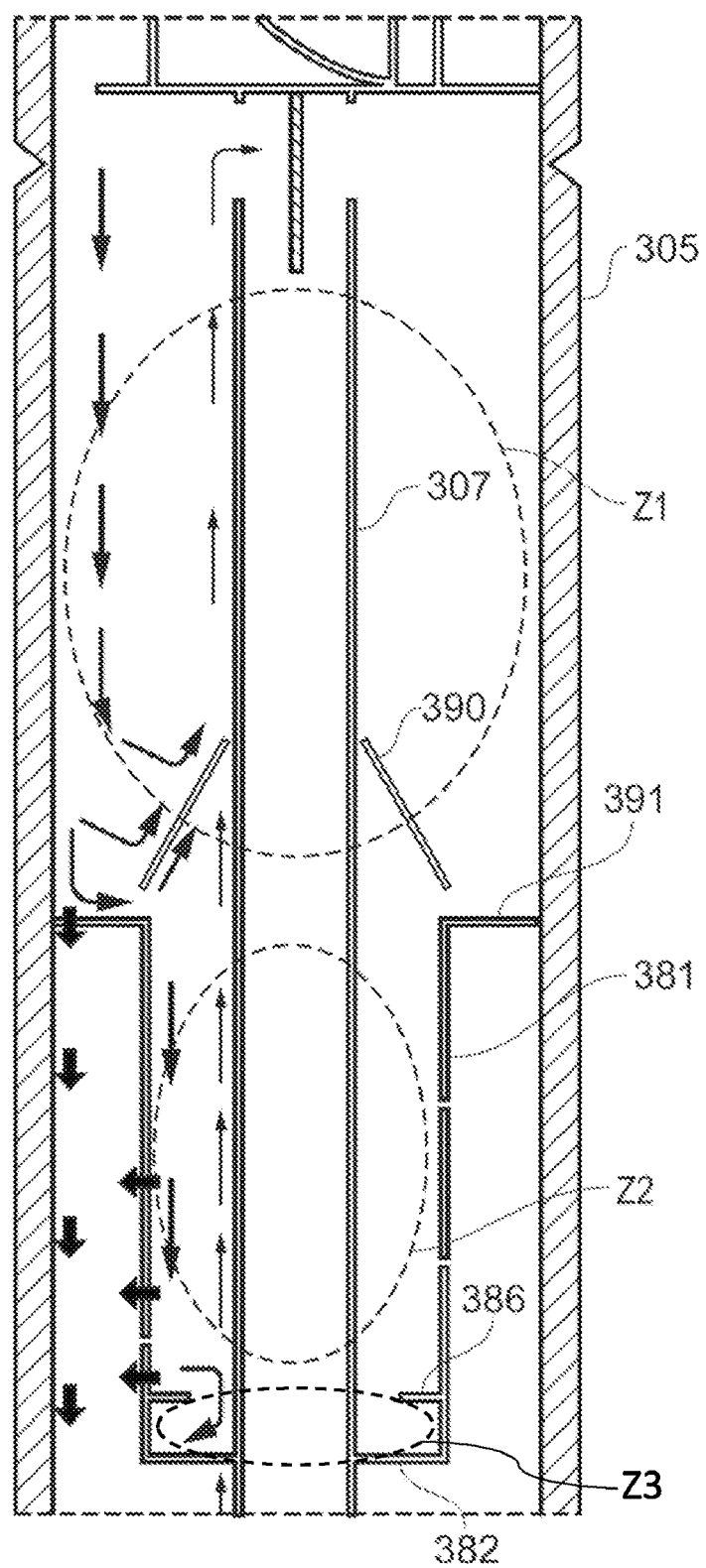
FIG. 9 shows a first embodiment of the principal of operation of the fluid separator of the present invention.
Figure 10:
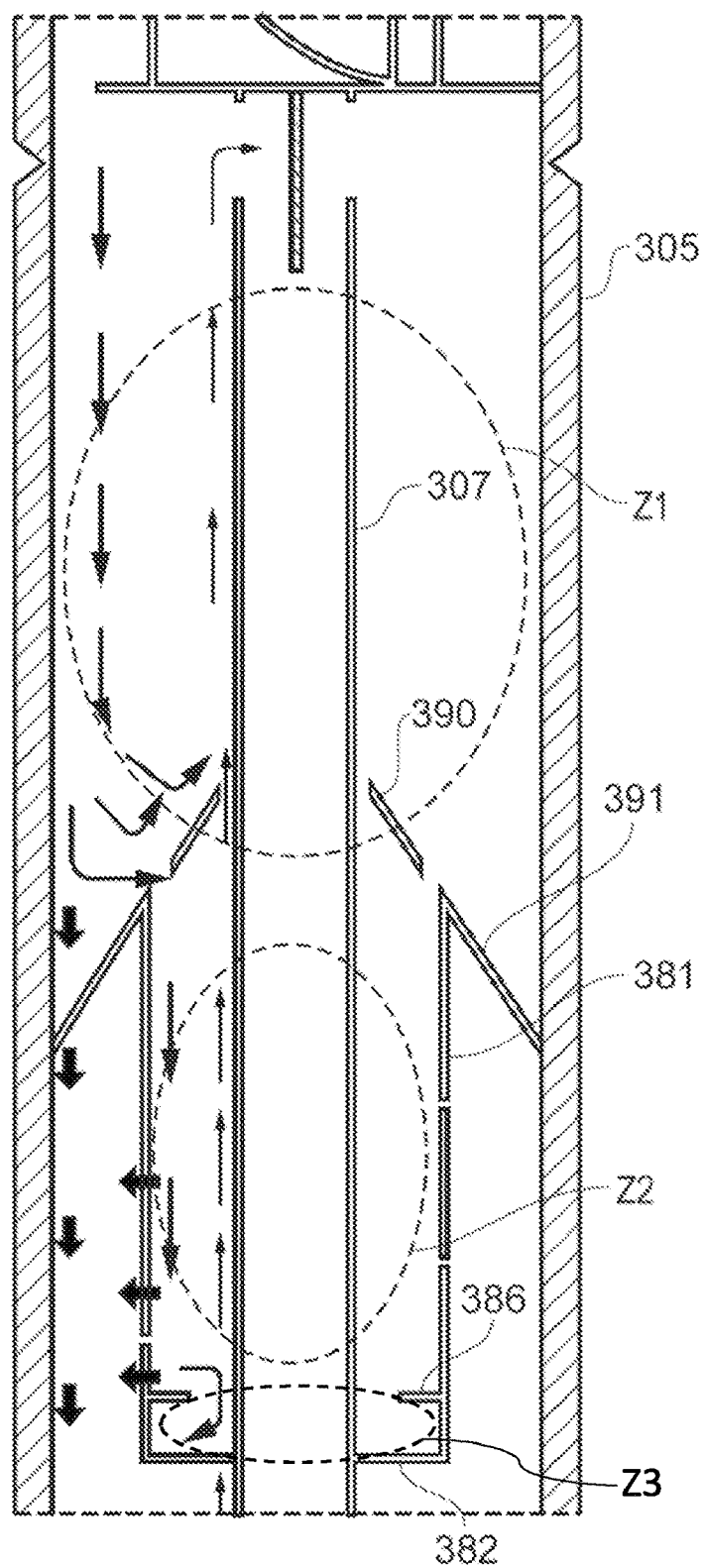
FIG. 10 shows a second embodiment of the principal of operation of the fluid separator of the present invention.
Figure 11:
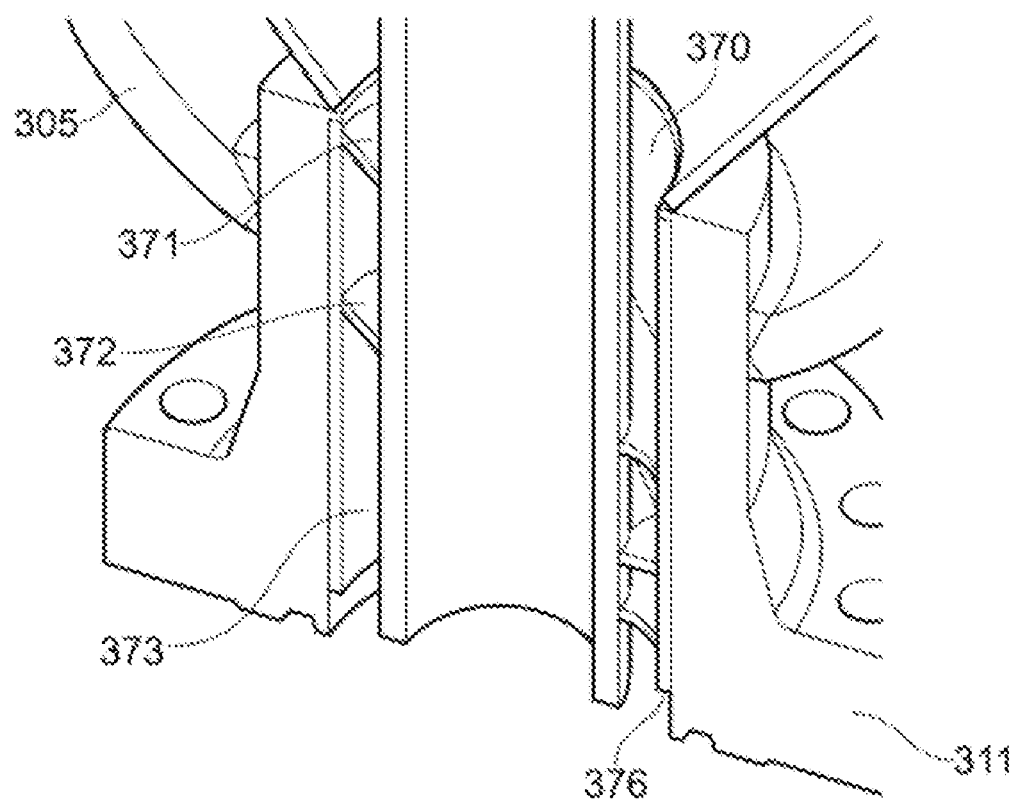
FIG. 11 shows a first aspect of the lower section of the body with a cylindrical channel extending through one or more plates.
Figure 12:
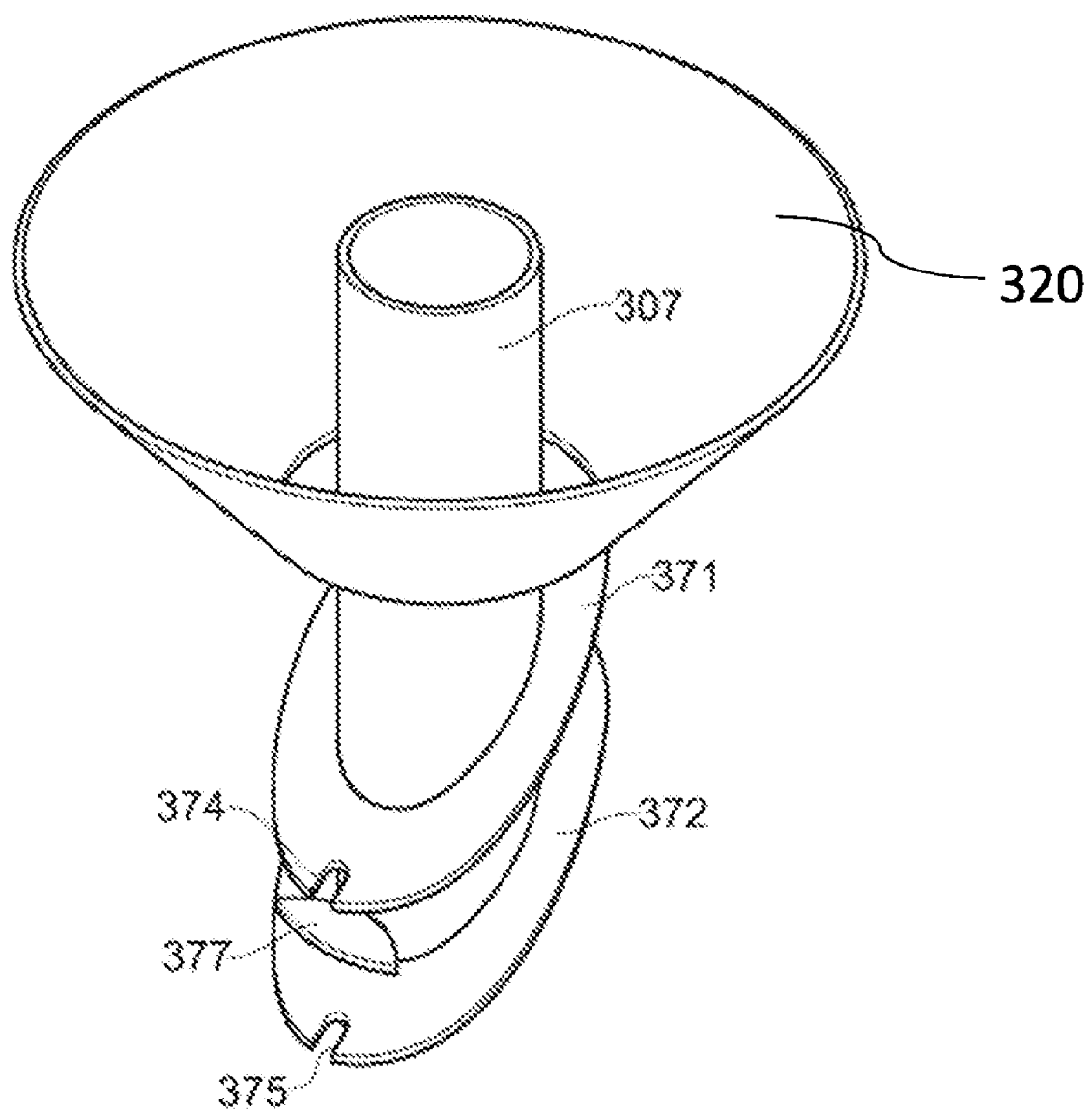
FIG. 12 shows a second aspect of the lower section of the body with three plates.
Figure 13:
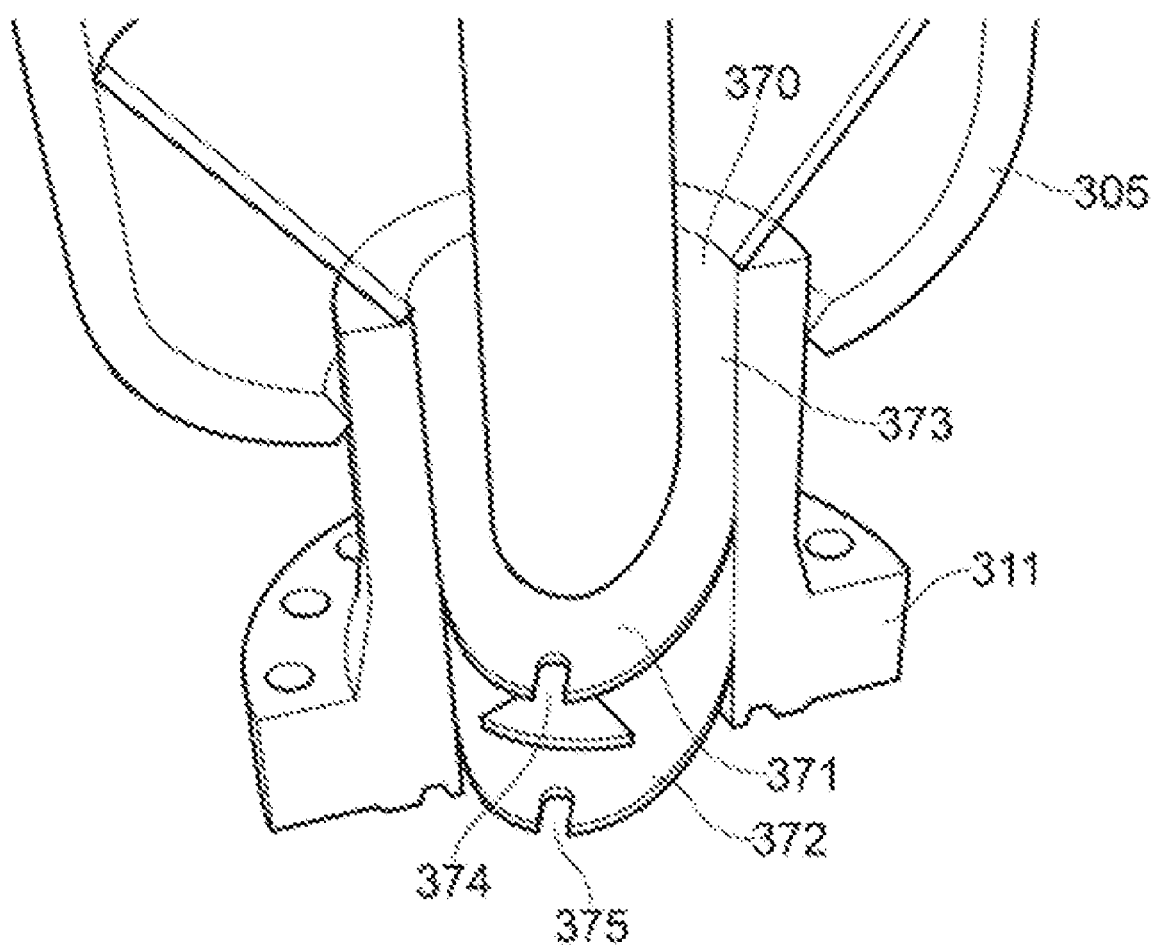
FIG. 13 shows a first view of a typical flow field through the flow channel via the arrangement of plates.

FIGS. 9 and 10 show the operational principle of the fluid separator unit 300. The embodiments in FIGS. 9 and 10 differ in that the angle and configuration of the swirl cone 390 and the spin-up plate 391 are shown in two alternative arrangements; there is otherwise no difference in the principle of operation.

FIGS. 9 and 10 generally show the middle section 302 of the body 305 in a cut view. The arrows indicate fluid flow paths in the cut plane. It will be understood that the fluid will also have a swirling motion in addition to the x-y velocities in the plane shown.

The fluid enters the body near the top, and primarily along the inner circumference of the body 305, with the flow being directed in a swirling motion around this circumference by the inlet 304. The incoming fluid flows downwards along the wall of the body 305 into a first centrifugal separation zone Z1, as indicated by the arrows. In FIGS. 9 and 10, the thickness of the arrows roughly indicates the density of the fluid at different positions within the body 305. As the inlet fluid proceeds downwards within first centrifugal separation zone Z1 in a swirling motion, the heavier fragments, such as water, solids (e.g., sand) and oil, will tend towards the outer circumference of the first centrifugal separation zone Z1, while the lighter fractions, such as light oils and gases, will tend towards the central part. The lighter oils and gases will proceed to flow upwards along the pipe 307, into the openings 3070 (see FIG. 2) and out through the pipe 307 and the first outlet 306. The first centrifugal separation zone Z1 thereby provides a first separation stage to separate gas and liquids.

Some heavier fragments, such as sand and some water, may flow downwards along the inner circumference of the body 305, through the perforations 391' (see FIG. 5), and also out through the first outlet 306. This is indicated by the thick arrows along the wall of body 305. This prevents sand build-up on the spin-up plate 391.

Remaining intermediate to heavy fluid fragments, typically heavier oil fractions and water, will proceed into the bucket defined by the cylindrical wall 381, and into a second centrifugal separation zone Z2. In this embodiment, the second centrifugal separation zone Z2 has a smaller diameter than the first centrifugal separation zone Z1, and fluid proceeding into the second centrifugal separation zone Z2 will therefore be subjected to increased spin, and thus increased centrifugal separation effect.

The heaviest of these fluids will proceed downwards along the cylindrical wall 381, as indicated by the intermediate arrows. Heavy fractions (e.g., sand) will proceed out through the slots 385 (see e.g., FIG. 8), as indicated by the thick, outwards arrows, and to the first outlet 306. Lighter fractions which are separated out by the now enhanced spin will proceed upwards along the pipe 307 and back into the first centrifugal separation zone Z1 (and subsequently out through the openings 3070).

The fluids flowing downwards along the inner circumference defined by the cylindrical wall 381 will proceed past the intermediate plate 386, and thus be forced further inwards and thereby be subjected to an additional increase in spin in a third centrifugal separation zone Z3, whereby the separation effect is further enhanced. This is also shown in FIG. 8. Some of this fluid will then flow out through the fourth opening 380 (see FIG. 6) which is located in the cylindrical wall 381 below the intermediate plate 386, and out through the second outlet 360. The remaining lighter fluid fraction will flow along the pipe 307 and out through the opening 3070. Additional slots in the cylindrical wall 381 close to the intermediate plate 386 can be included to avoid solids collection in this area.

The fluid provided through the second outlet 360 has therefore been subjected to a thorough separation process when passing through zones Z1, Z2 and Z3, and the fluid separator unit 300 can therefore provide such a fluid suitable, for example, for supply to a recycled liquid line to a pump. The fluid provided through second outlet 360 can thereby be provided with a minimum amount of solids (e.g., sand), and also lowest possible amount of oils potentially containing dissolved gases.

Reference is now made to FIGS. 11-14, which show aspects of the lower section 303 of the body 305, and the first outlet 306. A cylindrical channel 373 extends through the lower flange 311 and into the lower section 303 of the body. The pipe 307 may extend through, or end in, the cylindrical channel 373. One or more plates 371, 372 may be arranged in the cylindrical channel 373 leading from the second opening 370 to the first outlet 306. The plates 371, 372 assist to increase the local flow friction and limit flow without making the holes/openings 374 and 375 too small so as to risk blocking by solids for fluid removed from the lower section 303 of the body 305.

The plates 371, 372 may be arranged at an angle in relation to the walls of the cylindrical channel 373 which is different than 90 degrees. The plates 371, 372 can, for example, have the same angle as a cone 320 which is arranged in the body 305 and which is arranged to lead fluid towards the second opening 370. The plates 371, 372 have one or more holes 374, 375, or a different kind of opening, at a part of the plate which is closest to the first outlet 306. This improves flow conditions past the plate, and may, for example, assist in providing that sand cannot accumulate at any point in or around the flow path.

A third plate 377 (see FIG. 12) may be arranged between the first and second plates 371, 372, and at a different angle than the first and second plates 371, 372. This creates a labyrinth-type flow field for fluid and any solids exiting the body 305.

Figure 14:
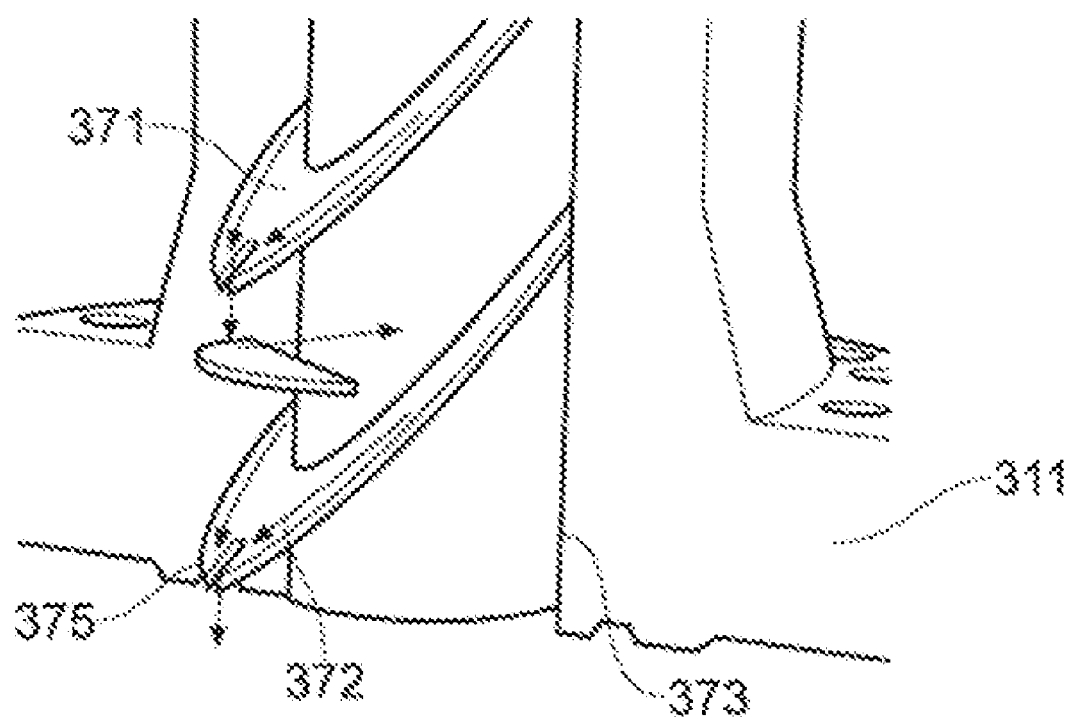
FIG. 14 shows a second view of a typical flow field through the flow channel via the arrangement of plates.

FIG. 14 shows a typical flow field through the cylindrical channel 373 with this arrangement of plates 371, 372, 377. This further provides a combination of relatively large flow openings and a considerable flow friction in the exiting fluid path, thereby reducing the risk of build-up of solids without having a very large flow rate.

Figure 15:
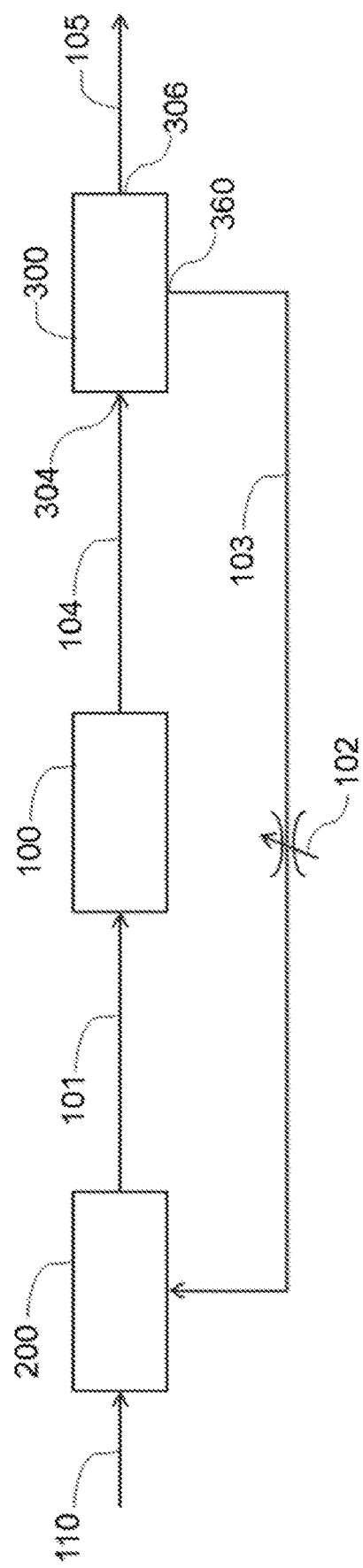
FIG. 15 shows a pump arrangement having a fluid separator of the present invention.

FIG. 15 shows a pump arrangement having a fluid separator unit 300 according to any of the embodiments described above, and a pressure boosting device 100. The pressure boosting device 100 may be a subsea pump. The pressure boosting device/subsea pump 100 receives a fluid stream 110, for example, from a petroleum well or other subsea processing components, via an inlet pipe 101 and an inlet fluid conditioning unit/inlet mixer 200. The pump 100 increases the pressure of the fluid and supplies it via a supply pipe 104 to the inlet 304 of the fluid separator unit 300.

A recycled liquid line 103 is arranged between the second outlet 360 of the fluid separator unit 300 and the inlet mixer 200. A pressure reduction valve 102, such as a choke, is arranged in the recycled liquid line 103. Via the recycled liquid line 103, recycled liquids can be supplied to the subsea pump 100 via the inlet mixer 200, thereby improving its performance, for example, when handling fluid streams with high gas content. An advantageous composition of the recycled liquid is obtained via the fluid separator unit 300, thereby minimizing the amount of solids which may be damaging to the pump, and also minimizing the amount of light liquids and/or gaseous fluids in the recycling line, which may reduce the performance of the pump 100 and increase energy usage.

The heaviest fractions (including water and solids, e.g., sand), as well as the lightest fractions (including petroleum products) can be passed through the first outlet 306 and to a process line 105 which may, for example, be a transport line, to a topside plant, to shore, or to other subsea processing equipment.

The present invention is not limited to embodiments described herein; reference should be had to the appended claims.

What is claimed is:

1. A fluid separator unit comprising:
   a body configured to be elongate and comprising a circular internal cross-section and a longitudinal axis;
   an inlet configured to direct a flow of a fluid into the body in a rotational flow pattern around the longitudinal axis of the body;
   a first outlet;
   a second outlet;
   a first centrifugal separation zone arranged within the body;
   a second centrifugal separation zone arranged within the body, a diameter of the second centrifugal separation zone being smaller than a diameter of the first centrifugal separation zone;
   a first fluid path from a central part of the first centrifugal separation zone to the first outlet;
   a second fluid path from an outer periphery of the second centrifugal separation zone to the first outlet;
   a third fluid path from the second centrifugal separation zone to the second outlet;
   a fourth fluid path from an outer periphery of the first centrifugal separation zone to the first outlet; and
   a spin-up plate arranged between the first centrifugal separation zone and the second centrifugal separation zone.

2. The fluid separator unit as recited in claim 1, wherein the third fluid path from the second centrifugal separation zone to the second outlet is arranged to extend through a third centrifugal separation zone.

3. The fluid separator unit as recited in claim 1, wherein, the spin-up plate comprises at least one hole, and
   the at least one hole is arranged at an outer periphery of the spin-up plate.

4. The fluid separator unit as recited in claim 3, wherein the at least one hole defines a part of the fourth fluid path from the outer periphery of the first centrifugal separation zone to the first outlet.

5. A pump arrangement comprising:
   the fluid separator as recited in claim 1;
   a supply pipe;
   a pressure boosting device comprising an inlet; and
   a recycled liquid line arranged between the second outlet and the inlet of the pressure boosting device, wherein,
the fluid separator is arranged to receive a fluid stream from the pressure boosting device via the supply pipe.

6. A fluid separator unit comprising:
a body configured to be elongate and comprising a circular internal cross-section and a longitudinal axis;
an inlet configured to direct a flow of a fluid into the body in a rotational flow pattern around the longitudinal axis of the body;
a first outlet;
a second outlet;
a first centrifugal separation zone arranged within the body;
a second centrifugal separation zone arranged within the body, a diameter of the second centrifugal separation zone being smaller than a diameter of the first centrifugal separation zone;
a first fluid path from a central part of the first centrifugal separation zone to the first outlet;
a second fluid path from an outer periphery of the second centrifugal separation zone to the first outlet;
a third fluid path from the second centrifugal separation zone to the second outlet;
a cylindrical wall arranged within the body, the cylindrical wall comprising an opening arranged therein; and
a pipe arranged to fluidly connect the opening to the second outlet,
wherein,
the second centrifugal separation zone is defined by the cylindrical wall, and
the third fluid path from the second centrifugal separation zone to the second outlet is provided by the opening which is arranged in the cylindrical wall and by the pipe fluidly connecting the opening to the second outlet.

7. A pump arrangement comprising:
the fluid separator as recited in claim 6;
a supply pipe;
a pressure boosting device comprising an inlet; and
a recycled liquid line arranged between the second outlet and the inlet of the pressure boosting device,
wherein,
the fluid separator is arranged to receive a fluid stream from the pressure boosting device via the supply pipe.

8. The fluid separator unit as recited in claim 6, further comprising:
a bottom plate which is fixed to a lower end of the cylindrical wall.

9. The fluid separator unit as recited in claim 8, further comprising:
an intermediate plate which is fixed to the cylindrical wall and is arranged to extend inwardly around an inner circumference of the cylindrical wall,
wherein,
the opening is arranged in the cylindrical wall between the intermediate plate and the bottom plate.

10. The fluid separator unit as recited in claim 9, further comprising:
a third centrifugal separation zone which is arranged between the intermediate plate and the bottom plate.

11. The fluid separator unit as recited in claim 6, wherein,
the cylindrical wall further comprises a radial opening arranged therein, and
the second fluid path from the outer periphery of the second centrifugal separation zone to the first outlet comprises the radial opening in the cylindrical wall.

12. The fluid separator unit as recited in claim 11, wherein the radial opening is arranged to extend in a spiral shape along the cylindrical wall.

13. The fluid separator unit as recited in claim 6, further comprising:
a second opening arranged in a lower section of the body, the second opening being fluidly connected to the first outlet.

14. The fluid separator unit as recited in claim 13, further comprising:
a cylindrical flow channel arranged between the second opening and the first outlet, the cylindrical flow channel comprising walls; and
a first plate arranged in the cylindrical flow channel, the first plate being arranged at an angle in relation to the walls of the cylindrical flow channel which is not 90°.

15. The fluid separator unit as recited in claim 14, wherein the first plate comprises an opening which is arranged at a part of the first plate which is closest to the first outlet.

16. The fluid separator unit as recited in claim 14, further comprising:
a second plate arranged in the cylindrical flow channel, the second plate being arranged at an angle in relation to the walls of the cylindrical flow channel which is not 90°.

17. The fluid separator unit as recited in claim 16, wherein the angle of the first plate in relation to the walls of the cylindrical flow channel is identical to the angle of the second plate in relation to the walls of the cylindrical flow channel.

18. The fluid separator unit as recited in claim 16, further comprising:
a third plate arranged in the cylindrical flow channel, the third plate being arranged between the first plate and the second plate.

19. The fluid separator unit as recited in claim 18, wherein an angle of the third plate in relation to the walls of the cylindrical flow channel is different from the angle of the first plate in relation to the walls of the cylindrical flow channel and different from the angle of the second plate in relation to the walls of the cylindrical flow channel.

20. A fluid separator unit comprising:
a body configured to be elongate and comprising a circular internal cross-section and a longitudinal axis;
an inlet configured to direct a flow of a fluid into the body in a rotational flow pattern around the longitudinal axis of the body;
a first outlet;
a second outlet;
a first centrifugal separation zone arranged within the body;
a second centrifugal separation zone arranged within the body, a diameter of the second centrifugal separation zone being smaller than a diameter of the first centrifugal separation zone;
a first fluid path from a central part of the first centrifugal separation zone to the first outlet;
a second fluid path from an outer periphery of the second centrifugal separation zone to the first outlet;
a third fluid path from the second centrifugal separation zone to the second outlet; and
a pipe comprising a plurality of first openings, the pipe being arranged within the body and being fluidly connected to the first outlet,
wherein, the first fluid path from the central part of the first centrifugal separation zone to the outlet is provided by the pipe, and the plurality of first openings of the pipe are arranged in the first centrifugal separation zone.

21. The fluid separator unit as recited in claim 20, wherein the pipe is arranged to extend through the cylindrical wall.

* * * * *